United States Patent [19]
Debush

[11] Patent Number: 5,279,330
[45] Date of Patent: Jan. 18, 1994

[54] ONE-WAY DISC VALVE

[75] Inventor: George Debush, Hamden, Conn.

[73] Assignee: ReSeal International Limited Partnership, New York, N.Y.

[21] Appl. No.: 4,395

[22] Filed: Jan. 14, 1993

[51] Int. Cl.$^5$ .............................................. F16K 15/14
[52] U.S. Cl. ..................................... 137/853; 137/860; 222/494
[58] Field of Search ............... 222/212, 213, 491, 494; 137/852, 853, 854, 860

[56] References Cited

U.S. PATENT DOCUMENTS

| 2,107,596 | 2/1938 | Bourdon | 137/853 |
| 4,283,991 | 8/1981 | Gaun et al. | 137/860 X |
| 4,846,810 | 7/1989 | Gerber | 222/494 X |
| 5,080,138 | 1/1992 | Haviv | 222/494 X |
| 5,080,139 | 1/1992 | Haviv | 137/860 |
| 5,092,855 | 3/1992 | Pardes | 137/853 X |
| 5,178,300 | 1/1993 | Haviv et al. | 222/494 X |

FOREIGN PATENT DOCUMENTS 733890 7/1955 United Kingdom ................. 137/860

Primary Examiner—Kevin P. Shaver
Attorney, Agent, or Firm—Anderson Kill Olick & Oshinsky

[57] ABSTRACT

A one-way valve for dispensing fluid assures, after the fluid has been dispensed, that any flow of contaminants into the source of the fluid is prevented. The one-way valve has a disc shaped valve body enclosed about the circumferential edge by an elastomeric membrane. Separate passageways conduct the fluid through the valve body with the fluid flowing from one passageway to the other between the circumferential edge and the elastomeric membrane. The valve body has a greater diameter than axial length.

8 Claims, 1 Drawing Sheet

ONE-WAY DISC VALVE

BACKGROUND OF THE INVENTION

The present invention is directed to a one-way valve for dispensing fluid and assures, after the fluid has been dispensed, that any flow of contaminants into the source of the fluid is prevented. The one-way valve has a disc shaped valve body enclosed about the circumferential edge by an elastomeric membrane. Separate passageways conduct the fluid through the valve body with the fluid flowing from one passageway to the other between the circumferential edge and the elastomeric membrane.

In the Gerber patent 4,846,810 issued Jul. 11, 1989, hereinafter the RESEAL valve, a one-way valve is shown formed by a valve body within an elastomeric membrane. In the patent the valve body is axially elongated. Such an arrangement has been found to be effective, however, if the height or length of the container and the one-way valve is to be kept to a minimum in dispensing certain fluids or if fluids with large particulates are being dispersed, the valve body shown in the patent is less effective.

SUMMARY OF THE INVENTION

Therefore, it is the primary object of the present invention to provide a one-way valve with a disc shaped valve body for limiting the overall height or axial length of a dispensing container employing the valve.

In accordance with the present invention, the disc shaped valve body has a diameter of a greater dimension than the axial dimension of the valve body. While the disc shaped valve body limits the axial length of the one-way valve there must be an adequate length of the fluid flow between the passageways in the disc shaped body. Accordingly, the length of the flow path between the elastomeric membrane and the valve body must be as long as possible to afford the effective operation of the valve.

To provide the desired flow between the valve body and the elastomeric membrane, a part of the membrane must be held in a fluid-tight manner against the circumferential surface or edge of the valve body to assure that the fluid does not bypass the intended flow passage.

An important feature of the invention is that the passageways open to the space between the circumference of the valve body and the inside surface of the elastomeric membrane and this space or flow passage is at a maximum extending for more than 180° around the valve body circumference.

In a preferred embodiment, the angular extent of the flow passage around the valve body is in the range of 200° to 270°. The angular extent is controlled to some degree by the diameter of the valve body, since there must be a sufficient sealed circumferential length between the valve body and the membrane.

In a preferred embodiment a housing laterally and circumferentially encircling the valve body holds the elastomeric membrane in sealed engagement with the circumference of the valve body and, in addition, seals the membrane to the opposite end faces of the valve body.

For the circumferential length of the flow passage between the valve body and the elastomeric membrane, the housing is spaced radially outwardly from the membrane. As a result, the membrane can expand into the space permitting flow inside the membrane. An opening is provided in the housing admitting atmospheric pressure to the outer surface of the membrane for assuring that it rebounds inwardly after the fluid has exited through the valve body, so that the membrane returns into fluid sealing contact with the openings from the passageways in the valve body.

The various features of novelty which characterize the invention are pointed out with particularity in the claims annexed to and forming a part of this disclosure. For a better understanding of the invention, its operating advantages attained by its use, reference should be had to the drawing and descriptive matter in which there is illustrated and described a preferred embodiment of the invention.

DETAILED DESCRIPTION OF THE INVENTION

Figure 1:
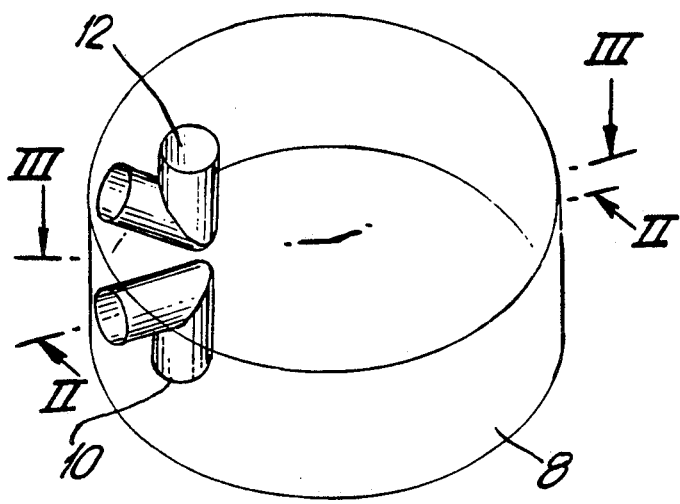
FIG. 1 is a perspective view of the one-way valve embodying the invention.

In the drawing the one-way valve 1 includes a disc shaped valve body 2 having a first end face 4 and a second end face 6 with a circumferentially extending edge or side surface 8 extending between the end surfaces A first passageway 10 extends from first end face 4 through the circumferential surface 8. A second passageway 12, forming a fluid outlet, extends from the circumferential surface 8 to the end face 6.

Though not shown, the disc shaped one-way valve would be mounted at the outlet from a container or source of the fluid to be dispensed. The fluid flows out of the container through the passageway 10.

Figure 2:
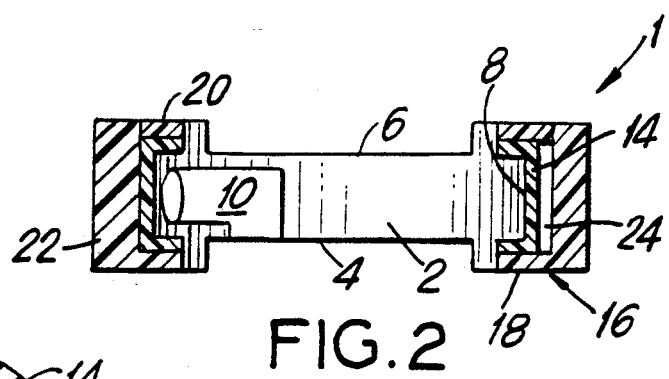
FIG. 2 is a cross-sectional view taken along the line II—II in FIG. 1.

Encircling the circumferential surface 8 is an elastomeric membrane 14 tightly fitted to the circumferential surface so that in the condition shown in FIG. 2 the membrane forms a fluid-tight seal at the opening out of the passageway 10 and into the passageway 12. The membrane cross-section, note FIG. 2, is generally C-shaped with opposite ends or legs of the C-shaped membrane fitted over and around the edges of the end faces 4, 6. Though not illustrated the opposite legs of the membrane can have a variety of shapes or thicknesses.

Laterally enclosing the membrane 14 and the valve body 2 in the circumferential direction is a housing 16. Housing 16 has a radially inwardly extending flange 18 which presses one edge or leg of the membrane 14 into fluid-sealing contact with the valve body 2. The housing 16 includes a separate annular member 20 fitted over and pressing the other leg of the membrane 14 into fluid-sealing contact with the end face 6 of the valve body 2.

Figure 3:
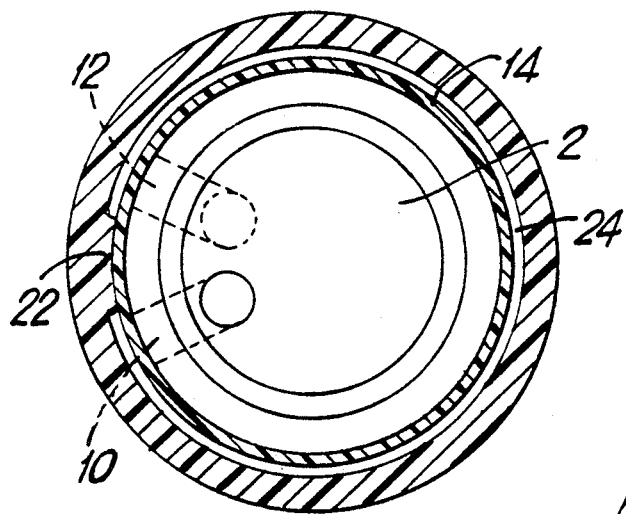
FIG. 3 is a cross-sectional view taken along line III—III in FIG. 1.
Figure 4:
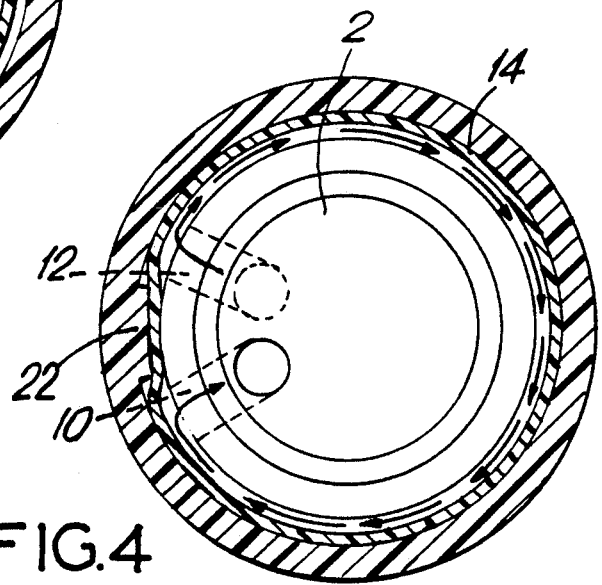
FIG. 4 is a view similar to FIG. 3, however, with the elastomeric membrane shown in the expanded condition so that fluid can flow through the one-way valve.

An angularly extending section 22 of the housing presses the membrane 14 into sealing contact with the circumferential surface of the valve body, note FIG. 3, preventing any flow between the passageways 10 and 12 for the angular section extending for about 90° or less. The remainder of the housing 16 is spaced radially outwardly from the outer surface of the membrane 14 providing a space or passage 24 extending for approximately three-quarters of the angular extent of the valve body 2. As a result, if fluid is forced out of the container, not shown, into the passageway 10, the membrane 14 expands outwardly from the circumferential surface 8 of the valve body 2, such as is shown in FIG. 4, so that the fluid flows out of the passageway 10 between the inside surface of the membrane 14 and the circumferential surface 8 of the valve body 2 to the inlet into the passageway 12. The fluid flows through the passageway 12 and is dispensed.

The fluid can be dispensed as drops, a spray, a mist or the like. The opening out of the passageway 12 can be shaped to provide the desired condition of the fluid as it is dispensed out the one-way valve.

The fluid can flow only in one direction around the circumferential surface 8 of the valve body 2. Due to the angular extent of the passage between the circumferential surface 8 and the inside surface of the elastomeric membrane 14, it is assured that the fluid is positively dispensed and the membrane rebounds into sealing contact with the circumferential surface assuring that the opening out of the passageway 10 and the opening into the passageway 12 are completely sealed preventing any backflow of contaminants into the source of the fluid.

An important feature of the invention is that all of the parts of the valve body are formed of plastics material. Since the collapsible container for the fluid can also be formed of a plastics material the entire dispenser is recyclable which is a particularly desirable environmental feature of the invention.

As can be appreciated by a person skilled in the art, the axial dimension of the valve body 2 can be limited to assure that the valve body can be used on a container whose dimensions are to be kept as small as possible. The disc shaped valve body 2 can be produced with a diameter of ½ inch and an axial dimension of ¼ inch. The axial extent of the passage 24 from the passageway 10 to the passageway 12 ensures that the passage 24 is closed after the fluid flows out of the passageway 12 so that no contaminants such as bacteria, air, gases, dust and the like can find their way into the container holding the fluid. The valve is particularly suitable for high flow rates out of the container while it takes up only a very small space.

In providing the fluid-tight seal of the membrane 14 with the circumferential surface of the valve body 2 in the region of the angular section 22 of the housing 16, the housing itself can provide the side seal or other means, such as an adhesive or welded connection between the membrane and the valve body or pressure provided by the housing can be used.

While a specific embodiment of the invention has been shown and described in detail to illustrate the application of the inventive principles, it will be understood that the invention may be embodied otherwise without departing from such principles.

I claim:

1. A one-way valve comprising a disc shaped valve body for regulating flow of a fluid from a source and having an axis, a diameter and an axial dimension with the diameter being greater than the axial dimension thereof, said valve body having a first end face and a second end face each traversing the axis and a circumferentially extending outer surface extending between the end faces, an expandable elastomeric membrane tightly laterally enclosing the outer surface of said valve body, said valve body having a first outlet passageway and a second outlet passageway therein with said passageways disposed in spaced relation, said first passageway has a first end in said first end face and a second end in said outer surface, said second passageway has a first end in said second end face and a second end in said outer surface, said second ends of said first and second passageways being spaced apart around said outer surface in the circumferential direction by a first angular dimension of less than 180° and by a second angular dimension of more than 180°, said elastomeric membrane being secured to said outer surface of said valve body between said second ends of said first and second passageway within the angular dimension less than 180° so that the membrane expands only between the second ends spaced apart by the angular dimension of more than 180° whereby with the membrane expanded by flow through the first passageway to the second passageway the flow can pass along the angular dimension of more than 180° of the first and second passageways.

2. A one-way disc valve, as set forth in claim 1, including means for effecting the fluid-tight seal between said membrane and said valve body so that flow between the membrane and the valve body cannot pass through the fluid-tight seal.

3. A one-way valve, as set forth in claim 2, wherein said means comprise a housing extending circumferentially around the circumferential surface of said valve body and as part of said housing, extending angularly around said valve body pressing said membrane against said valve body in fluid-sealing contact therewith.

4. A one-way valve, as set forth in claim 3, wherein said part of said housing is located between the second ends of said first and second passageways in the region where the angular dimension therebetween is less than 180°.

5. A one-way valve, as set forth in claim 1, wherein the angular dimension between said second ends of more than 180° is in the range of 200° to 280°.

6. A one-way valve, as set forth in claim 1, wherein said membrane in axial section is generally C-shaped.

7. A one-way valve, as set forth in claim 3, wherein said membrane in axial section is generally C-shaped with a center section and a leg extending from each end of said center section with the center section contacting the circumferentially extending outer surface and each said leg contacting a different one of said first and second end faces, said housing comprises an annular wall encircling said membrane and having an axis extending in the direction of the axial dimension of said valve body, said annular wall having a first end adjacent the first end face of said valve body with a radially inwardly extending flange in bearing contact with one of said legs of said membrane and pressing the one of said legs against said valve body and an annular member fitted within said annular wall and pressing the other of said legs of said membrane against said second end face of said valve body.

8. A one-way valve, as set forth in claim 7, wherein said annular wall has a first circumferentially extending section forming said part of said housing pressing said membrane in fluid tight sealing contact with said valve body, and a second circumferentially extending section spaced radially outwardly from said membrane and forming a closed circumferential space into which said membrane can expand radially outwardly.

* * * * *

UNITED STATES PATENT AND TRADEMARK OFFICE
CERTIFICATE OF CORRECTION

PATENT NO.   : 5,279,330
DATED        : Jan. 18, 1994
INVENTOR(S)  : George Debush It is certified that error appears in the above-indentified patent and that said Letters Patent is hereby corrected as shown below:

The title page, should be deleted to be replaced with the attached title page.

The drawing sheet, consisting of Figs. 1-4, Fig. 4, should be deleted to be replaced with Fig. 4, as shown on the attached page.

Signed and Sealed this

Fifth Day of July, 1994

Attest:

BRUCE LEHMAN

Attesting Officer        Commissioner of Patents and Trademarks

United States Patent [19]

Debush

[11] Patent Number: 5,279,330

[45] Date of Patent: Jan. 18, 1994

[54] ONE-WAY DISC VALVE

[75] Inventor: George Debush, Hamden, Conn.

[73] Assignee: ReSeal International Limited Partnership, New York, N.Y.

[21] Appl. No.: 4,395

[22] Filed: Jan. 14, 1993

[51] Int. Cl.⁵ ............................................. F16K 15/14
[52] U.S. Cl. ................................... 137/853; 137/860; 222/494
[58] Field of Search ............... 222/212, 213, 491, 494; 137/852, 853, 854, 860

[56] References Cited

U.S. PATENT DOCUMENTS

| | | | |
|---|---|---|---|
| 2,107,596 | 2/1938 | Bourdon | 137/853 |
| 4,283,991 | 8/1981 | Gaun et al. | 137/860 X |
| 4,846,810 | 7/1989 | Gerber | 222/494 X |
| 5,080,138 | 1/1992 | Haviv | 222/494 X |
| 5,080,139 | 1/1992 | Haviv | 137/860 |
| 5,092,855 | 3/1992 | Pardes | 137/853 X |
| 5,178,300 | 1/1993 | Haviv et al. | 222/494 X |

FOREIGN PATENT DOCUMENTS 733890  7/1955  United Kingdom ............... 137/860

*Primary Examiner*—Kevin P. Shaver
*Attorney, Agent, or Firm*—Anderson Kill Olick & Oshinsky

[57] ABSTRACT

A one-way valve for dispensing fluid assures, after the fluid has been dispensed, that any flow of contaminants into the source of the fluid is prevented. The one-way valve has a disc shaped valve body enclosed about the circumferential edge by an elastomeric membrane. Separate passageways conduct the fluid through the valve body with the fluid flowing from one passageway to the other between the circumferential edge and the elastomeric membrane. The valve body has a greater diameter than axial length.

8 Claims, 1 Drawing Sheet

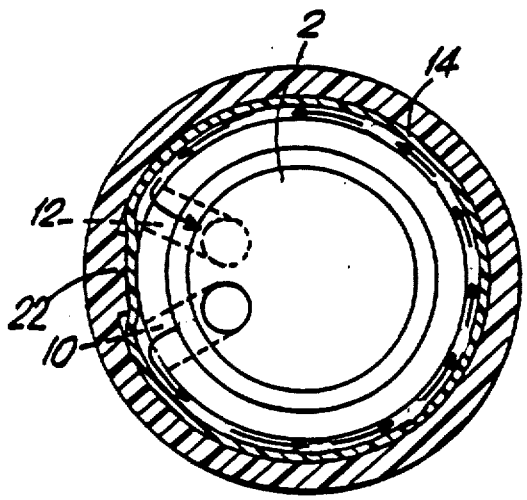

UNITED STATES PATENT AND TRADEMARK OFFICE
CERTIFICATE OF CORRECTION

PATENT NO. : 5,279,330    Page 3 of 3
DATED     : Jan. 18, 1994
INVENTOR(S) : George Debush It is certified that error appears in the above-indentified patent and that said Letters Patent is hereby corrected as shown below:

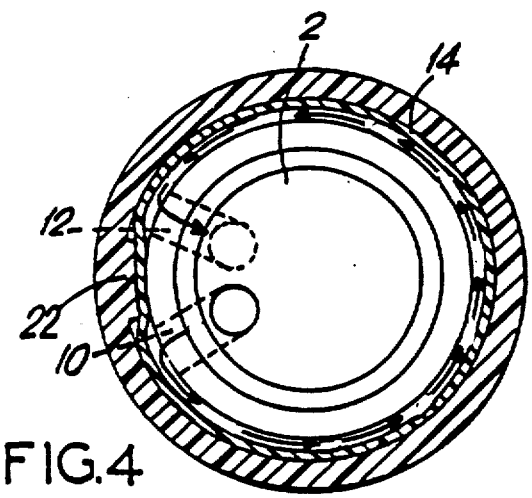

FIG.4